United States Patent [19]
Yoshikawa et al.

[11] Patent Number: 6,113,469
[45] Date of Patent: Sep. 5, 2000

[54] METHOD OF POLISHING FERRULE FOR OPTICAL CONNECTOR INTO CONVEX SPHERICAL SURFACE

[75] Inventors: Tomohiro Yoshikawa; Kouji Minami, both of Tokyo, Japan

[73] Assignee: Seiko Instruments Inc., Japan

[21] Appl. No.: 09/296,080

[22] Filed: Apr. 21, 1999

[30] Foreign Application Priority Data

Apr. 23, 1998 [JP] Japan .................................. 10-113807

[51] Int. Cl.[7] .................................................. B24B 11/00
[52] U.S. Cl. ................................ 451/41; 451/57; 451/60; 451/59; 451/63
[58] Field of Search ................................. 451/41, 59, 63, 451/278, 285, 287, 57, 37, 60, 270, 271, 43, 44, 290

[56] References Cited

U.S. PATENT DOCUMENTS 5,667,426 9/1997 Minami et al. ........................... 451/41
5,855,503 1/1999 Csipkes et al. ........................... 451/41

OTHER PUBLICATIONS

Patent Abstracts of Japan, vol. 010, No. 358 (P–522) Dec. 2, 1986.
Patent Abstracts of Japan, vol. 098, No. 003 Feb. 27, 1998.
Patent Abstracts of Japan, vol. 096, No. 002 Feb. 29, 1986.
Patent Abstracts of Japan, vol. 098, No. 008 Jun. 30, 1998.
Patent Abstracts of Japan, vol. 095, No. 004 May 31, 1995.

*Primary Examiner*—Derris H. Banks
*Attorney, Agent, or Firm*—Adams & Wilks

[57] ABSTRACT

A method of polishing the end face of a ferrule on an optical connector comprises providing a polishing sheet containing abrasive grains and providing a polishing fluid containing abrasive grains having a hardness greater than that of the abrasive grains of the polishing sheet. The end face of the ferrule including an optical fiber is pressed against a surface of the polishing sheet while effecting relative movement between the ferrule and the polishing sheet and while supplying the polishing fluid onto the surface of the polishing sheet.

28 Claims, 1 Drawing Sheet

METHOD OF POLISHING FERRULE FOR OPTICAL CONNECTOR INTO CONVEX SPHERICAL SURFACE

BACKGROUND OF THE INVENTION

1. Field of the Invention

The present invention relates to an improved method of polishing the end face of a ferrule as one member constituting the optical connector into a convex spherical surface.

2. Description of the Related Art

It is a common practice that an optical fiber for transmitting optical signals, which is composed of a core of quartz or the like and a clad covering it, has its end held by a ferrule, and the end face of the ferrule is polished into a convex spherical surface, with its vertex being at the core, such that the resulting surface is mirror-finished or rough-finished.

The conventional method of polishing the end face of a ferrule into a convex spherical surface consists of pressing the end face of the ferrule holding an optical fiber against a polishing sheet, which is formed of a resin substrate and diamond abrasive grains bonded thereto by a binder and is fixed on an elastically deformable base of the polishing machine, while moving the base such that the ferrule sweeps a nearly constant path on the polishing sheet which is being supplied with water.

However, the disadvantage of the conventional method resides in that in the layer of abrasive grains of the polishing sheet, which is composed of a sheet and diamond abrasive grains attached thereto, has a short life, with the abrasive grains being deformed and deteriorated and dropped off, after several repetitions of the polishing operation.

Another disadvantage resides in that the end face of the ferrule polished by using a fresh polishing sheet is rougher than the end face of the ferrule polished by using a worn-out polishing sheet. This is undesirable although the difference in surface roughness is within tolerance. Thus, there is a demand for improvement in the constancy of surface roughness.

Moreover, carrying out polishing by moving the base of the polishing machine, to which the polishing sheet is fixed, such that the ferrule holding an optical fiber sweeps a nearly constant path on the polishing sheet is not economical because the polishing sheet remains partly unused (or the polishing sheet has a part with which the end face of the ferrule does not come into contact). In addition, simultaneous polishing of the optical fiber and the ferrule which differ in hardness necessitates the use of a polishing sheet with expensive diamond abrasive grains. This and the foregoing prevent the cost reduction of the product.

SUMMARY OF THE INVENTION

It is an object of the present invention to provide a method of polishing the end face of a ferrule for the optical connector into a convex spherical surface, with a view to greatly decreasing the product cost and stabilizing the product quality.

The first aspect of the present invention to solve the above-mentioned problems resides in a method of polishing the end face of a ferrule on an optical connector into a convex spherical surface by pressing the end face of the ferrule including an optical fiber against a surface of a polishing sheet having abrasive grains bonded while moving both relative to each other, characterized in that the abrasive grains bonded to the polishing sheet have a hardness high enough for polishing the optical fiber and the polishing sheet is supplied with a polishing fluid containing abrasive grains which have a higher hardness than that of the abrasive grains and are capable of polishing the ferrule.

The second aspect of the present invention resides in a method of polishing the ferrule an the optical connector into a convex spherical surface as defined in the first aspect, in which the abrasive grains containing the polishing fluid are coarser than those bonded to the polishing sheet.

The third aspect of the present invention resides in a method of polishing the ferrule an the optical connector into a convex spherical surface as defined in the first or second aspect, in which the abrasive grains of the polishing sheet are particles of at least one species selected from the group consisting of alumina, zirconia, chromium, silicon carbide, silicon nitride, CBN sintered body, cerium oxide, and quartz powder.

The fourth aspect of the present invention resides in a method of polishing the ferrule an the optical connector into a convex spherical surface as defined in any of the first to third aspects, in which the abrasive grains contained in the polishing fluid are particles of at least one species selected from the group consisting of diamond, alumina, zirconia, chromium, silicon carbide, silicon nitride, CBN sintered body, cerium oxide, and quartz powder.

DETAILED DESCRIPTION OF THE PREFERRED EMBODIMENTS

Figure 1A:
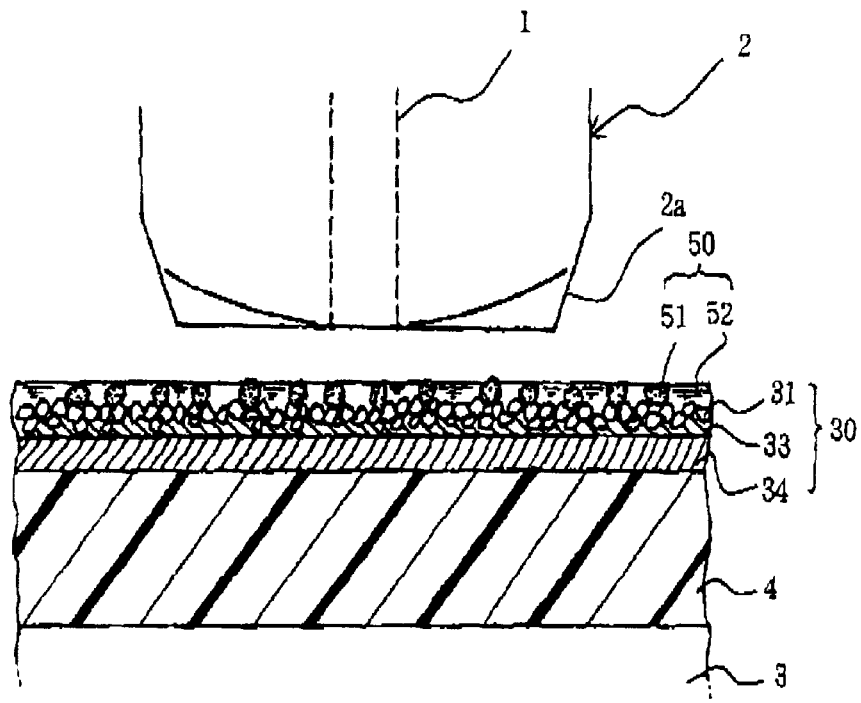
FIGS. 1A & 1B is a schematic diagram showing how to polish the ferrule for the optical connector into a convex spherical surface according to the method of the present invention.

Polishing the end face of a ferrule according to the method of the present invention is embodied as explained below with reference to the accompanying drawing.

In one embodiment of the present invention, the end face of a ferrule 2 holding an optical fiber 1 is polished by using a polishing machine of any known type having a polishing machine comprised of a polishing board 3 which supports a polishing sheet 30 via an elastically deformable base 4, and having a driving unit (not shown) which simultaneously rotates and revolves the polishing board 3 about its center and about its prescribed eccentric center, respectively. The polishing machine is also provided with a device (not shown) which supports the ferrule 2 holding an optical fiber 1 consisting of a core of quarts or the like for transmitting optical signals and a clad in such a way that the ferrule 2 can be slid in the vertical direction perpendicular to a polishing sheet 30 and which presses the ferrule 2 against the polishing sheet 30 under a prescribed pressure at the time of polishing.

On the other hand, the polishing sheet 30 mounted on the base 4 is composed of a resin substrate 34 and abrasive grains 31 bonded thereto with a binder 33, and it is mounted on and fixed to the base 4.

The abrasive grains 31 of the polishing sheet 30 should be those which have a hardness high enough to polish the optical fiber 1, such as particles of at least one species selected from the group consisting of alumina, zirconia, chromium, silicon carbide, silicon nitride, CBN sintered body, cerium oxide, and quartz powder, with alumina being economically adequate.

Polishing the ferrule 2 with the polishing sheet 30 employs a polishing fluid 50, which is composed of abrasive grains 51 which are coarser and harder than abrasive grains 31 and are capable of polishing the ferrule 2 and a medium 52 of water or oil (water being preferable) in which the abrasive grains 51 are dispersed. The medium may contain an optional dispersing stabilizer and the like, if necessary. The abrasive grains 51 should preferably be of diamond or the like in the case where the ferrule is made of ceramics such as zirconia, however, they may be those which can be used for the abrasive grains 31 to meet the above-mentioned requirements in the case where the ferrule is made of glass, or the like.

Figure 1B:
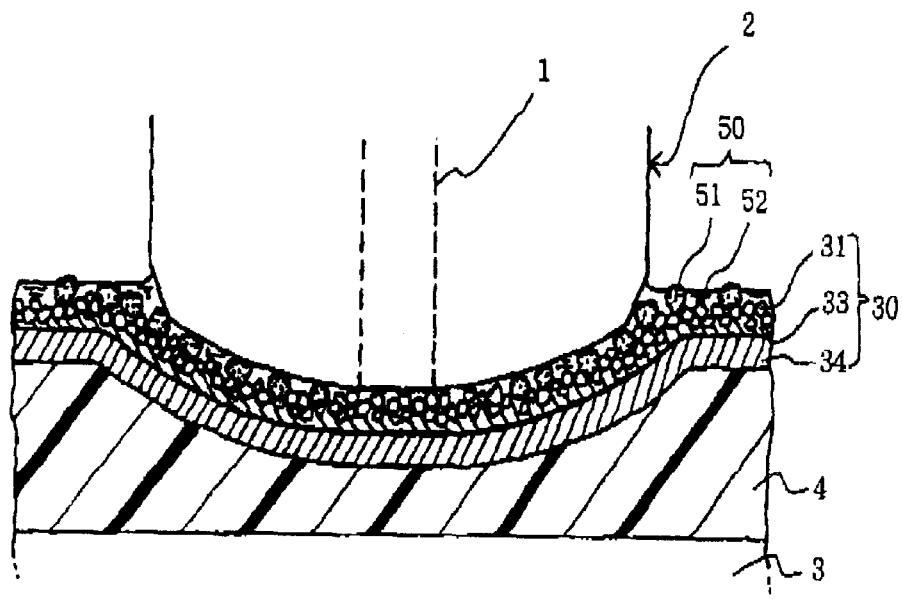

To polish the ferrule 2 according to the above-mentioned arrangement, the ferrule 2 is pressed against the polishing sheet 30 which is supported via the base 4 on the polishing board 3 being turned and driven while the polishing sheet 30 is being supplied with a predetermined amount of polishing fluid 50, as shown in FIG. 1(*a*) and (*b*). Incidentally, the ferrule 2 used in this embodiment has a flat end face and a chamfered periphery.

During polishing, the base 4, which is an elastic body of rubber or the like, undergoes elastic deformation under the pressing force, so that the surface of the polishing sheet 30 is bent in conformity with the end face of the ferrule 2.

Polishing proceeds in this way. First, the end face of the ferrule 2 has its periphery (corner) 2*a* polished mainly by the abrasive grains 51 of the polishing fluid 50 to become round, and is gradually polished into a convex spherical surface with its vertex at the core which is the center of the optical fiber 1. As polishing into the convex spherical surface proceeds to some extent, contact gradually disappears between the optical fiber 1 and the abrasive grains 51 of the polishing fluid 50, with the result that the part of the optical fiber 1 is polished mainly by the abrasive grains 31 of the polishing sheet 30 while the part of the ferrule 2 surrounding it is polished mainly by the abrasive grains 51 of the polishing fluid 50, the abrasive grains 31 and 51 bearing their share of the polishing part, as shown in FIG. 1(*b*).

By the foregoing method, the abrasive grains 31 and 51, which differ in grain size and hardness, polish the different work materials, thereby polishing the end face of the ferrule into a convex spherical surface with its vertex at the core. In addition, since polishing is accomplished by the abrasive grains 51 which are continuously renewed by the supply of the polishing fluid 50, it is only necessary to supply as much as necessary. This contributes to efficient polishing and economical improvement.

The cost of polishing with the polishing sheet 30 (an alumina sheet), which was repeatedly used five times, and the polishing fluid 50 containing the abrasive grains 51 (diamond grains) was estimated to be about one half the cost of polishing with a conventional diamond sheet, which was repeatedly used ten times. In addition, a diamond sheet almost ends its life after it has been used repeatedly ten times and it is likely that the result of polishing becomes poor as the number of repetition increases. However, this is not the case with the method of the present invention, which permits invariable polishing at all times.

The abrasive grains 31 and the abrasive grains 51 (especially the latter) may have any grain size which is selected according to the stage of polishing, e.g., rough polishing, medium polishing, and finish polishing. The abrasive grains 31 are not specifically restricted so long as they meet the requirement that they should be finer than the abrasive grains 51 and capable of supporting the abrasive grains 51. Usually, they have a particle diameter in the range of about 0.1 to 15 $\mu$m. In addition, the polishing sheet 30 supporting such abrasive grains 31 should preferably have an average surface roughness (Ra) of about 0.1 to 1 $\mu$m, although this condition is not limitative.

In polishing according to the above-mentioned embodiment, the polishing fluid is simply delivered as much as necessary onto the polishing sheet. Alternatively, it is possible to wipe out the polishing fluid after the completion of polishing and to newly supply a proper amount of polishing fluid to the polishing sheet when polishing is resumed. Furthermore, it is possible to recycle the polishing fluid after its use.

The embodiment mentioned above is designed to polish a ferrule into a convex spherical surface, the ferrule having a flat end face and a chamfered periphery. It may be modified such that the end face of the ferrule is formed into a rough convex spherical surface by a preliminary step and then it is mirror-finished by the above-mentioned means. If the polishing time is extended, it is possible to polish a flat end face of a ferrule directly into a mirror surface, and this offers an advantage of eliminating the preliminary step for rough polishing.

The present invention constructed as mentioned above produces good effects as follows. The advantage of polishing in such a way that the end face of a ferrule holding an optical fiber is pressed against a polishing sheet and both are moved relative to each other, the polishing sheet having inexpensive abrasive grains fixed thereto which have a prescribed hardness necessary to polish the optical fiber and being supplied with a polishing fluid containing abrasive grains which have a prescribed hardness to polish the ferrule and are coarser than the abrasive grains of the polishing sheet, is that two kinds of abrasive grains differing in hardness polish two kinds of work materials differing hardness, that is, the abrasive grains of the polishing sheet polish the optical fiber and the abrasive grains of the polishing fluid polish the ferrule to make the end face of the ferrule into a convex spherical surface, and fresh abrasive grains are used in a minimum amount necessary at all times so as to realize the consistent quality and economical operation.

What is claimed is:

1. A method of polishing an end face of a ferrule holding an optical fiber into a convex spherical surface, comprising the steps of: pressing the end face of the ferrule including an optical fiber against a surface of a polishing sheet disposed on an elastic body and containing abrasive grains bonded thereto, the abrasive grains having a hardness high enough for polishing the optical fiber; and moving the ferrule and the polishing sheet relative to each other while supplying a polishing fluid containing abrasive grains onto the surface of the polishing sheet, the abrasive grains contained in the polishing fluid having a hardness greater than that of the abrasive grains contained in the polishing sheet.

2. A method of polishing an end face of a ferrule into a convex spherical surface as claimed in claim 1; wherein the abrasive grains contained in the polishing fluid are coarser than the abrasive grains contained in the polishing sheet.

3. A method of polishing an end face of a ferrule into a convex spherical surface as claimed in claim 2; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

4. A method of polishing an end face of a ferrule into a convex spherical surface as claimed in claim 3; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

5. A method of polishing an end face of a ferrule into a convex spherical surface as claimed in claim 2; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

6. A method of polishing an end face of a ferrule into a convex spherical surface as claimed in claim 1; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

7. A method of polishing an end face of a ferrule into a convex spherical surface as claimed in claim 1; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

8. A method of polishing an end face of a ferrule, comprising the steps: providing a polishing sheet containing abrasive grains; providing a polishing fluid containing abrasive grains having a hardness greater than that of the abrasive grains of the polishing sheet; and pressing the end face of the ferrule including an optical fiber against a surface of the polishing sheet while effecting relative movement between the ferrule and the polishing sheet and while supplying the polishing fluid onto the surface of the polishing sheet.

9. A method according to claim 8; wherein the abrasive grains contained in the polishing fluid are coarser than the abrasive grains contained in the polishing sheet.

10. A method according to claim 9; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

11. A method according to claim 10; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

12. A method according to claim 9; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

13. A method according to claim 8; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

14. A method according to claim 8; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

15. A method of polishing an end face of a ferrule, comprising the steps: providing an optical connector having a ferrule and an optical fiber fixed to the ferrule; providing a polishing member comprised of an elastically deformable base and a polishing sheet disposed on the base, the polishing sheet having a resin substrate and abrasive grains bonded to the resin substrate; providing a polishing fluid containing abrasive grains having a hardness greater than that of the abrasive grains of the polishing sheet; and pressing an end face of the ferrule against a surface of the polishing sheet while effecting relative movement between the ferrule and the polishing sheet and while supplying the polishing fluid onto the surface of the polishing sheet.

16. A method according to claim 15; wherein the abrasive grains contained in the polishing fluid are coarser than the abrasive grains contained in the polishing sheet.

17. A method according to claim 16; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

18. A method according to claim 17; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

19. A method according to claim 16; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

20. A method according to claim 15; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

21. A method according to claim 15; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

22. A method of polishing the end face of a ferrule, comprising the steps: providing a polishing sheet containing abrasive grains; providing a polishing fluid containing abrasive grains having a hardness greater than that of the abrasive grains contained in the polishing sheet; and pressing the end face of the ferrule including an optical fiber against a surface of the polishing sheet while effecting relative movement between the ferrule and the polishing sheet and while supplying the polishing fluid onto the surface of the polishing sheet to thereby polish the end face of the ferrule such that at an initial stage of polishing, a periphery of the end surface of the ferrule is primarily polished by the abrasive grains contained in the polishing fluid and the end face of the ferrule is gradually polished into a convex spherical surface having a vertex coincident with a center of the optical fiber, and as polishing of the end face of the ferrule proceeds, a portion of the optical fiber at the vertex of the convex spherical surface is primarily polished by the abrasive grains contained in the polishing sheet while portions of the end face of the ferrule surrounding the optical fiber continue to be primarily polished by the abrasive grains contained in the polishing fluid.

23. A method according to claim 22; wherein the abrasive grains contained in the polishing fluid are coarser than the abrasive grains contained in the polishing sheet.

24. A method according to claim 23; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

25. A method according to claim 24; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

26. A method according to claim 23; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

27. A method according to claim 22; wherein the abrasive grains contained in the polishing fluid comprise particles of at least one species selected from the group consisting of alumina, zirconia, chromium, silicon carbide, silicon nitride, a CBN sintered body, cerium oxide, and quartz powder.

28. A method according to claim 22; wherein the abrasive grains contained in the polishing sheet comprise particles of at least one species selected from the group consisting of alumina, zirconia, chromium, silicon carbide, silicon nitride, a CBN sintered body, cerium oxide, and quartz powder.

* * * * *